(12) United States Patent
Moon

(10) Patent No.: US 8,810,066 B2
(45) Date of Patent: Aug. 19, 2014

(54) POWER STORAGE SYSTEM AND METHOD OF CONTROLLING THE SAME

(75) Inventor: Chong-Sop Moon, Yongin-si (KR)

(73) Assignee: Samsung SDI Co., Ltd., Gyeonggi-Do (KR)

(*) Notice: Subject to any disclaimer, the term of this patent is extended or adjusted under 35 U.S.C. 154(b) by 422 days.

(21) Appl. No.: 12/968,073

(22) Filed: Dec. 14, 2010

(65) Prior Publication Data

US 2011/0148205 A1    Jun. 23, 2011

(30) Foreign Application Priority Data

Dec. 17, 2009    (KR) .................. 10-2009-0126117

(51) Int. Cl.
*H02J 7/00*    (2006.01)

(52) U.S. Cl.
USPC ............................................. 307/65

(58) Field of Classification Search
USPC ............................................. 307/65
See application file for complete search history.

(56) References Cited

U.S. PATENT DOCUMENTS

| | | | | |
|---|---|---|---|---|
| 6,949,843 | B2* | 9/2005 | Dubovsky | 307/64 |
| 2008/0067869 | A1* | 3/2008 | Evans et al. | 307/11 |
| 2009/0302691 | A1* | 12/2009 | Wang et al. | 307/129 |

FOREIGN PATENT DOCUMENTS

| | | |
|---|---|---|
| JP | 2001-224142 (A) | 8/2001 |
| JP | 2001-268800 A | 9/2001 |
| JP | 2002-171674 (A) | 6/2002 |
| JP | 2002-238184 (A) | 8/2002 |
| JP | 2004-104851 (A) | 4/2004 |
| JP | 2004-180467 A | 6/2004 |

OTHER PUBLICATIONS

Korean Office Action dated Apr. 11, 2011 for Korean Patent Application No. KR 10-2009-0126117 which corresponds to captioned U.S. Appl. No. 12/968,073.

* cited by examiner

*Primary Examiner* — Jared Fureman
*Assistant Examiner* — Duc M Pham
(74) *Attorney, Agent, or Firm* — Knobbe, Martens, Olson & Bear, LLP

(57) ABSTRACT

A power storage system and method of controlling the system is disclosed. The power storage system is connected to a power generation system and a grid. If a remaining amount of power of a battery is insufficient when the grid is in a quasi-normal state, the battery is charged by directly receiving electric power from the grid, and thus electric power is available for the if the grid subsequently goes back into the abnormal state.

19 Claims, 5 Drawing Sheets

POWER STORAGE SYSTEM AND METHOD OF CONTROLLING THE SAME

CROSS-REFERENCE TO RELATED APPLICATIONS

This application claims the benefit of Korean Patent Application No. 10-2009-0126117, filed on Dec. 17, 2009, in the Korean Intellectual Property Office, the disclosure of which is incorporated herein in its entirety by reference.

BACKGROUND

1. Field of the Invention

The disclosed technology relates to a power storage system connected to a power generation system and a grid, and a method of controlling the power storage system.

2. Description of the Related Technology

As green energy and energy conservation are emphasized, interest in power storage systems for efficiently generating, storing, and using power is increasing. Also, research into new forms of energy and renewable energy, such as solar energy, wind power, tidal power, and soil productivity, is being actively conducted.

Electric power generators, such as power companies, produce power from various resources which have varying degrees of reliability. For instance, renewable energy resources are naturally replenished but flow-limited. They are virtually inexhaustible in duration but limited in the amount of energy that is available per unit time.

Furthermore, to supply electric power to consumers, the power generators must distribute their energy to a power grid. An electric power grid is a system of synchronized power providers and consumers connected by transmission and distribution lines and operated by one or more control centers. Thus, the reliability of adequate power for distribution depends on both the availability generated and the proper flow through the grid.

A breakdown in either power provider or grid can cause a complete or partial power outage. In addition, there may be a transition period, sometimes called a quasi-normal state, that occurs between such abnormal and normal states of power distribution. In these instances of disruption, a battery back up for the load i.e. a device that uses electric power, on the consumer side may be used to maintain effective reliability to the electric power user.

SUMMARY OF CERTAIN INVENTIVE ASPECTS

One aspect is a power storage system. The power storage system is configured to receive power from a power generation system and a grid and to provide power to a load. The power storage system includes a first power converter connected between the power generation system and a first node, and configured to convert the electric power generated by the power generation system to a direct current (DC) voltage of the first node. The power storage system also includes a bidirectional inverter connected between the first node and a second node, where the bidirectional inverter is configured to output power of the DC voltage of the first node to the second node after performing DC to alternating current (AC) conversion on the DC voltage of the first node, and to output power of an AC voltage of the second node to the first node after performing AC-DC conversion. The power storage system also includes a bidirectional converter connected between a battery and the first node, where the bidirectional converter is configured to output power of the DC voltage of the first node to the battery after performing DC-DC conversion, and to output power of a DC voltage from the battery to the first node after performing DC-DC conversion. The battery includes at least one battery cell. The power storage system also includes a battery management system configured to control charging and discharging of the at least one battery cell, and an integrated controller configured to charge the battery with electric power from the power generation system and the grid, and to control the first power converter, the bidirectional converter, the bidirectional inverter, and the battery management system so that the electric power is selectively supplied to the load and the grid by discharging the battery, where the integrated controller is configured to charge the battery with electric power from the grid if the remaining amount of power of the battery is insufficient and the grid is in a quasi-normal state.

Another aspect is a power storage system, configured to receive power from a power generation system and a grid and to provide power to a load. The power storage system includes a first switch configured to selectively connect the battery and the power generation system to the load, a second switch configured to connect the grid to the load, and a controller configured to determine a state of the grid and a state of the battery and to control the first and second switches according to the state of the grid.

Another aspect is a method of operating a power storage system including a battery, the system connected to a power generator, a load, and a power grid. The method includes determining the state of the power grid. The method also includes if the power grid is in a normal state, selectively charging the battery with power from at least one of the power generator and the power grid, and selectively providing power to the load from at least one of the power generator, the battery, and the power grid. The method also includes if the power grid is in an abnormal state, selectively charging the battery with power from the power generator, and selectively providing power to the load from at least one of the power generator and the battery. The method also includes if the power grid is in a quasi-normal state, selectively charging the battery with power from at least one of the power generator and the power grid, and selectively providing power to the load from the grid, where an electrical path used to charge the battery if power grid is in the quasi-normal state is different than an electrical path used to the battery if power grid is in the normal or abnormal.

BRIEF DESCRIPTION OF THE DRAWINGS

These and/or other aspects will become apparent and more readily appreciated from the following description of various embodiments, taken in conjunction with the accompanying drawings of which.

DETAILED DESCRIPTION OF CERTAIN INVENTIVE EMBODIMENTS

Figure 1:
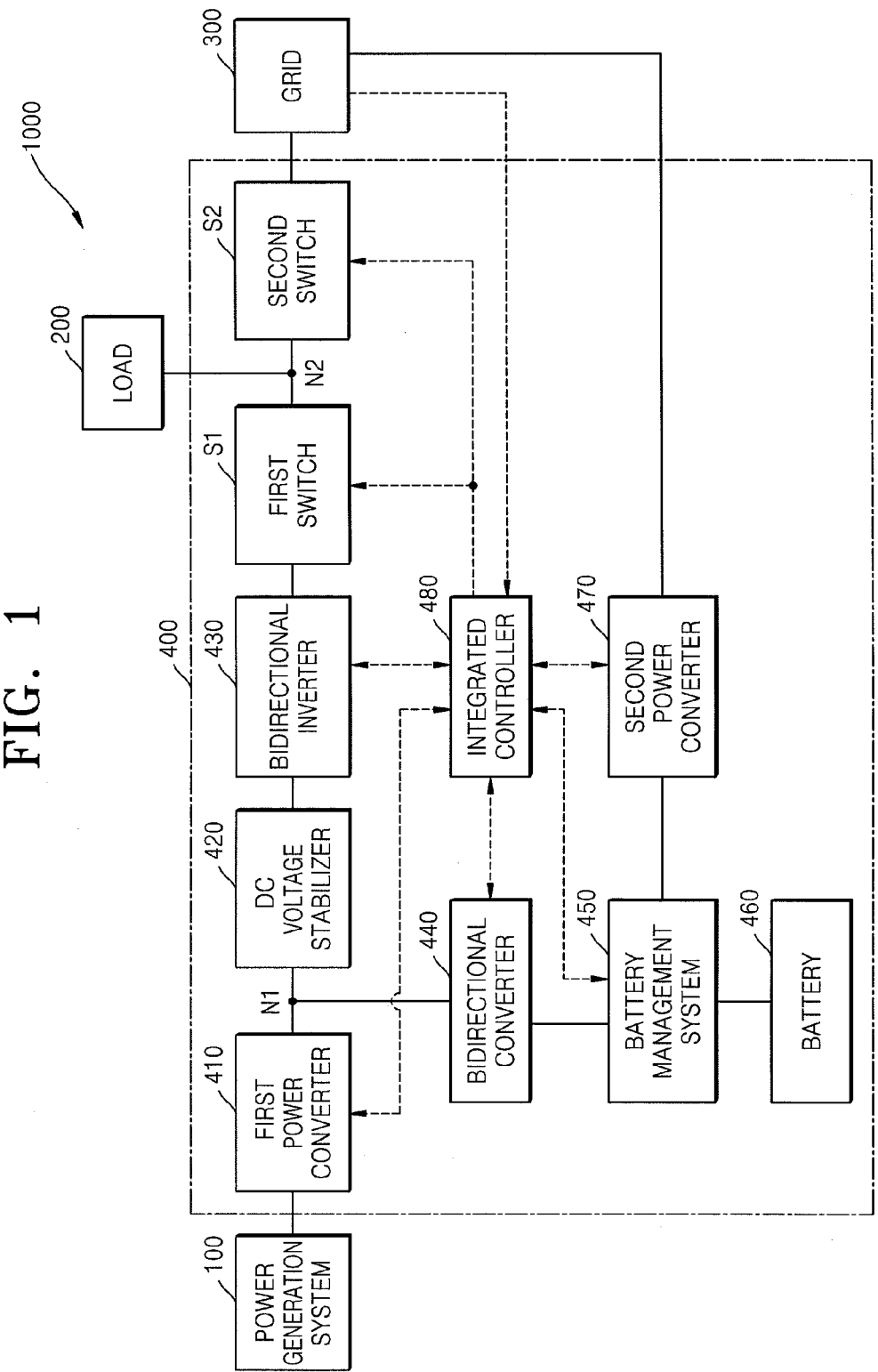
FIG. 1 is a block diagram illustrating a power storage system according to an embodiment.

Reference will now be made to certain embodiments, examples of which are illustrated in the accompanying drawings. In this regard, embodiments may have different forms and should not be construed as being limited to the specific descriptions set forth herein. Accordingly, the exemplary embodiments are described below, with reference to the figures, to explain certain inventive aspects. Also, while describing the embodiments, detailed descriptions about related known functions or configurations are generally omitted.

The terms "first", "second", or the like may be used to describe different elements, but the elements are not limited by those terms. The terms may be used to distinguish one element from other elements.

The terms used herein are for descriptive purposes only. In some instances, singular forms may include plural forms as well, unless defined otherwise. The terms "include", "have", or the like are used to designate existence of, for example, a characteristic, a number, a step, an operation, an element, a part, or a combination thereof, and are not to be understood to exclude existence or addition of one or more other characteristics, numbers, steps, operations, elements, parts, or combinations thereof.

A power storage system connected to a grid is used to connect a power generation system to the grid. If sufficient electric power is generated in the power generation system, the electric power is supplied to a load and/or to the grid, and in some circumstances, a battery may be charged. If the power generation system does not generate sufficient electric power for the load, the load may receive additional electric power from the grid, or in some circumstances, from the battery. If the grid is in an abnormal state, the power storage system may stop operating, and the battery may be charged only if all of the elements of the power storage system are functioning normally after some time after the grid is restored. Accordingly, if the grid is in an abnormal state for a long period of time, the electric power stored in the battery is insufficient for the load.

A power storage system and a method of controlling the same according to embodiments will now be described with reference to attached drawings. In the drawings, like reference numerals generally denote like elements.

FIG. 1 is a block diagram illustrating a power storage system 1000 according to some embodiments.

Referring to FIG. 1, the power storage system 1000 includes a power generation system 100, a load 200, a grid 300, and a power storage device 400. The power storage device 400 includes a first power converter 410, a DC voltage stabilizer 420, a bidirectional inverter 430, a bidirectional converter 440, a battery management system (BMS) 450, a battery 460, a first switch S1, a second switch S2, a second power converter 470, and an integrated controller 480.

In FIG. 1, power flow between each element is shown as a solid line, and control signals are shown as dotted lines.

The power generation system 100 generates electric power, for example, by using new forms of energy generation or renewable energy generation. The power generation system 100 generates electric power, for example, by using solar energy, such as solar heat or sunlight, wind power, geothermal heat, water power, marine power, or hydrogen.

The load 200 consumes electric power received from the power generation system 100, the grid 300, or the power storage device 400. The load 200 may, for example, be a facility such as a house, a building, or a factory.

The grid 300 is an electric grid including a power plant, a substation, and a power cable. The state of the grid 300 may be a normal state, an abnormal state, and a quasi-normal state. In the normal state, the grid 300 functions properly, and thus the grid 300 performs power transferring normally. In the abnormal state of the grid 300, the grid 300 is unable to operate normally due to, for example, a ground fault, a short circuit, a power failure, or a situation, such as repairing of power distribution lines. If the grid 300 is in the abnormal state, the power storage device 400 and the grid 300 are disconnected from each other so as to prevent an accident such as an electric shock. The grid 300 is in the quasi-normal state before the grid 300 returns to the normal state after being restored from the abnormal state, and generally holds the quasi-normal state for several seconds to several minutes. For example, the quasi-normal state may continue for 5 minutes to 10 minutes. According to some embodiments, the battery 460 may be charged by receiving electric power from the grid 300 even though the grid 300 is restored from the abnormal state and is in the quasi-normal state.

The first power converter 410 is connected to the power generation system 100 and to a first node N1. The first power converter 410 converts electric power generated by the power generation system 100 and transmits the converted electric power to the first node N1 at a different DC operating voltage than the DC voltage of the power generation system 100. Operation of the first power converter 410 is based on a type of the power generation system 100. For example, if the power generation system 100 generates an alternating current (AC) voltage, the first power converter 410 converts the AC voltage to a direct current (DC) voltage of the first node N1. Alternatively, if the power generation system 100 generates a DC voltage, the first power converter 410 converts the DC voltage of the power generation system 100 to a DC voltage of the first node N1.

The bidirectional inverter 430 is connected between the first node N1 and a second node N2. The bidirectional inverter 430 converts a DC voltage output from the power generation system 100 through the first power converter 410, or a DC voltage output from the battery 460 through the bidirectional converter 440, to an AC voltage to be supplied to the load 200 or to the grid 300. Alternatively, the bidirectional inverter 430 rectifies an AC voltage output from the grid 300 to a DC voltage to be stored in the battery 460. For example, the bidirectional inverter 430 may include a full bridge inverter (not shown) and a filter (not shown) for removing high frequency components of the AC voltage. However, the bidirectional inverter 430 may have any other structure.

The bidirectional converter 440 is connected between the battery 460 and the first node N1. The bidirectional converter 440 performs DC-DC conversion on a DC voltage output from the first power converter 410 or the bidirectional inverter 430 to be transmitted to the battery 460. Also, the bidirectional converter 440 performs DC-DC conversion on a DC voltage output from the battery 460 to be transmitted to the first node N1. For example, if a voltage level of the first node N1 is 380 V and a voltage level required to charge the battery 460 is 100 V, a DC voltage of 380 V is converted to a DC voltage of 100 V so as to charge the battery 460, and a DC voltage of 100 V is converted to a DC voltage of 380 V to be supplied to the first node N1.

The DC voltage stabilizer 420 is connected between the first node N1 and the bidirectional inverter 430. The DC voltage stabilizer 420 stabilizes a voltage level of the first node N1 to a DC link voltage level. The voltage level of the first node N1 may be unstable due to a dramatic change in electric power generated by the power generation system 100 or an instantaneous voltage drop in the grid 300. Accordingly, the DC voltage stabilizer 420 is used to maintain a substantially uniform voltage at the first node N1 for stable operations of the bidirectional inverter 430 and the bidirectional converter 440. The DC voltage stabilizer 420 may be, for example, an aluminum electrolytic capacitor, a polymer capacitor, a multi-layer ceramic capacitor, or a super capacitor.

The first switch S1 is connected between the bidirectional inverter 430 and the second node N2. The second switch S2 is connected between the second node N2 and the grid 300. The first and second switches S1 and S2 are turned on or off according to control of the integrated controller 480. For example, if the grid 300 is in the normal state, the integrated controller 480 turns on the first and second switches S1 and S2 to connect the load 200 and the grid 300 with the bidirectional inverter 430. Alternatively, if the grid 300 is in an abnormal state, the integrated controller 480 turns on the first switch S1 and the turns off the second switch S2 to connect the load 200 with the power storage device 400 and disconnect the power storage device 400 from the grid 300. Alternatively, if the grid 300 is in the quasi-normal state, the integrated controller 480 turns off the first switch S1 and turns on the second switch S2 to disconnect the load 200 from the bidirectional inverter 430. Because the second switch S2 is turned on, the restored grid 300 and the load 200 are connected to each other, and thus the load 200 receives electric power from the grid 300. In addition, electric power from the restored grid 300 is stored in the battery 460 through a path from the grid 300 to the battery 460 through a second power converter 470 and the BMS 450.

The battery 460 is charged by receiving electric power from the power generation system 100 or the grid 300, and supplies the electric power to the load 200 or the grid 300. The battery 460 includes a plurality of battery cells connected in series or in parallel. The battery 460 may be a secondary cell that may be charged and discharged, such as a nickel-cadmium battery, a lead storage battery, a nickel metal hydride battery, a lithium ion battery, a lithium polymer battery, a nickel zinc battery, or the like. Charging and discharging of the battery 460 is controlled by the BMS 450.

The BMS 450 is connected between the battery 460 and the bidirectional converter 440. The BMS 450 controls charging and discharging of the battery according to control of the integrated controller 480. The BMS 450 controls the charging and discharging of each battery cell by calculating a state of charge (SOC) or a state of health (SOH) by sensing one or more of a voltage, a current, and a temperature of each battery cell. The BMS 450 determines overcharge, over-discharge, over-voltage, over-current, or overheating, by detecting at least one of the voltage, the current, and the temperature of each battery cell, and may include a protection circuit (not shown) for one or more of prohibiting charging and discharging of the battery cell, forcibly discharging the battery cell, and cooling the battery cell.

The second power converter 470 is connected between the battery 460 and the grid 300. If the grid is in the quasi-normal state, the second power converter 470 performs AC-DC conversion on an AC voltage from the grid 300, and outputs the DC voltage to the battery 460. According to some embodiments, as shown in FIG. 1, the second power converter 470 is included in the power storage device 400 so as to be operated under control of the integrated controller 480. On the other hand, the second power converter 470 may not be included in the power storage device 400, and may be an individual element that is not controlled by the integrated controller 480. For example, separate from the power storage device 400, the second power converter 470 may be connected between the grid 300 and the battery 460, and may convert and transmit a voltage from the grid 300 to the battery 460 if the grid 300 is in the quasi-normal state. Alternatively, the second power converter 470 may be integrated to the BMS 450, or may be realized by using some other method.

The integrated controller 480 controls operation of the power storage device 400. The integrated controller 480 receives one or more of a voltage sensing signal, a current sensing signal, and a temperature sensing signal, which are sensed from the first power converter 410, the bidirectional inverter 430, the bidirectional converter 440, and the second power converter 470, and controls conversion operation to improve efficiency. Also, the integrated controller 480 determines at least one of a voltage, a current, a temperature, and an AC phase of the grid 300, thereby monitoring whether the grid 300 is in the normal state, the abnormal state, or the quasi-normal state. The integrated controller 480 controls the first and second switches S1 and S2 according to the state of the grid 300. In addition, the integrated controller 480 monitors a state of the battery 460 through the BMS 450. In some embodiments, the integrated controller 480 checks a remaining amount of power of the battery 460 by interfacing with the BMS 450 if the grid 300 is in the quasi-normal state. Since the electric power path to the power generation system 100, battery 460, load 200, or the grid 300 is different according to the state of the grid 300 and the remaining amount of power of the battery 460, the integrated controller 480 may control all of the elements in any or all of the electric power paths. This will be described in detail later with reference to FIGS. 3A through 3C.

Figure 2:
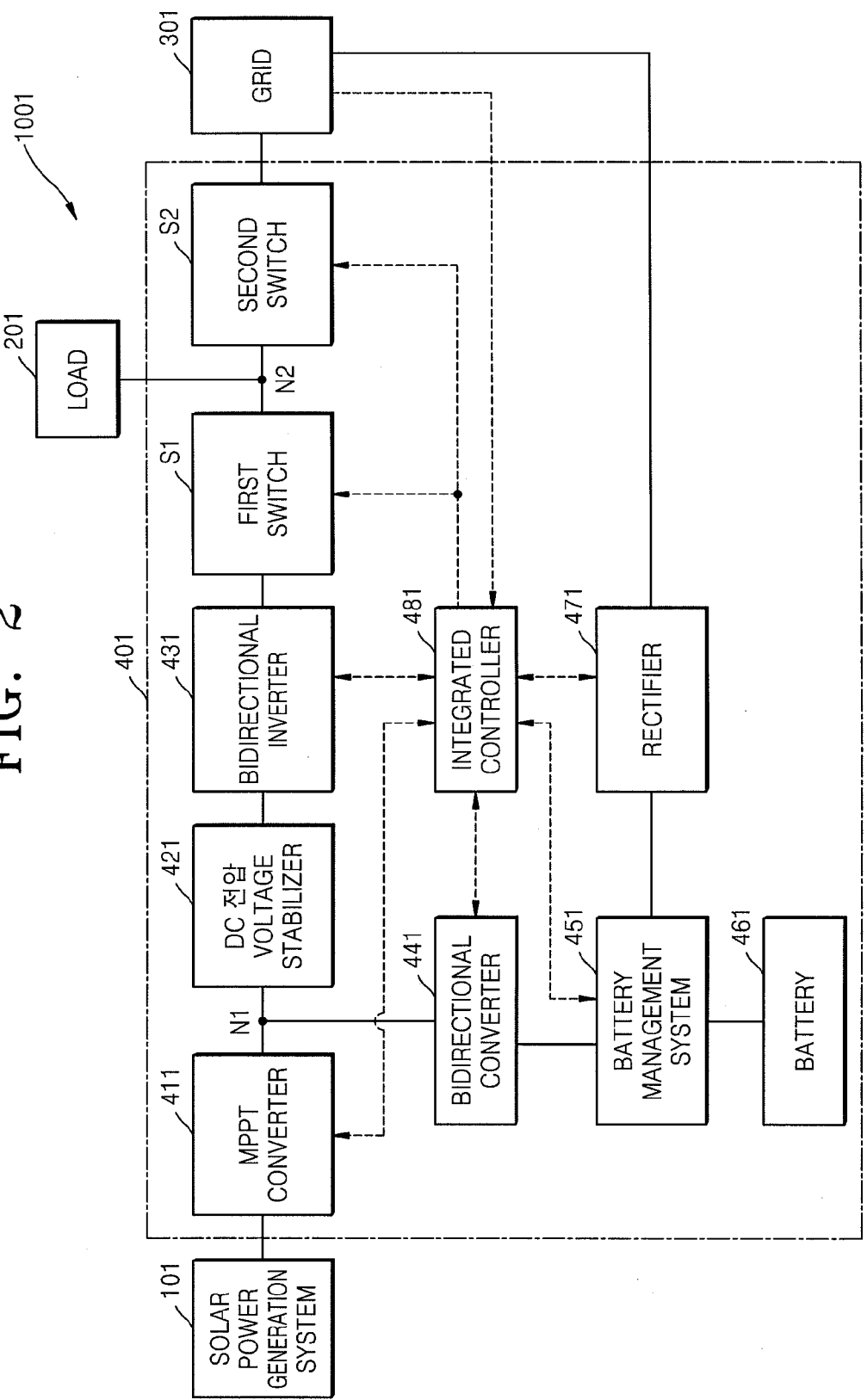
FIG. 2 is a block diagram illustrating a power storage system according to another embodiment.

FIG. 2 is a block diagram illustrating a power storage system 1001 according to another embodiment.

The power storage system 1001 of FIG. 2 similar functionality to the power storage system 100 of FIG. 1.

Referring to FIG. 2, the power generation system of FIG. 2 is a solar power generation system 101. The solar power generation system 101 may include a solar cell array in which a plurality of solar cell modules are used for generating DC power by receiving sunlight and are connected in parallel or in series.

If the power generation system is the solar power generation system 101 in FIG. 2, a maximum power point tracker (MPPT) converter 411 may be used as a power converter. In order to perform effective DC-DC conversion, the MPPT converter 411 adjusts a power generation voltage level to follow the maximum power supply voltage for receiving the maximum power from the solar power generation system.

A rectifier 471 in FIG. 2 may be used to perform similar functions as the second power converter 470 of FIG. 1. The rectifier 471 may, for example, be a half wave rectifier, a short wave rectifier, or a bridge rectifier, which converts an AC voltage from a grid 301 to a DC voltage to be stored in a battery 461.

Figure 3A:
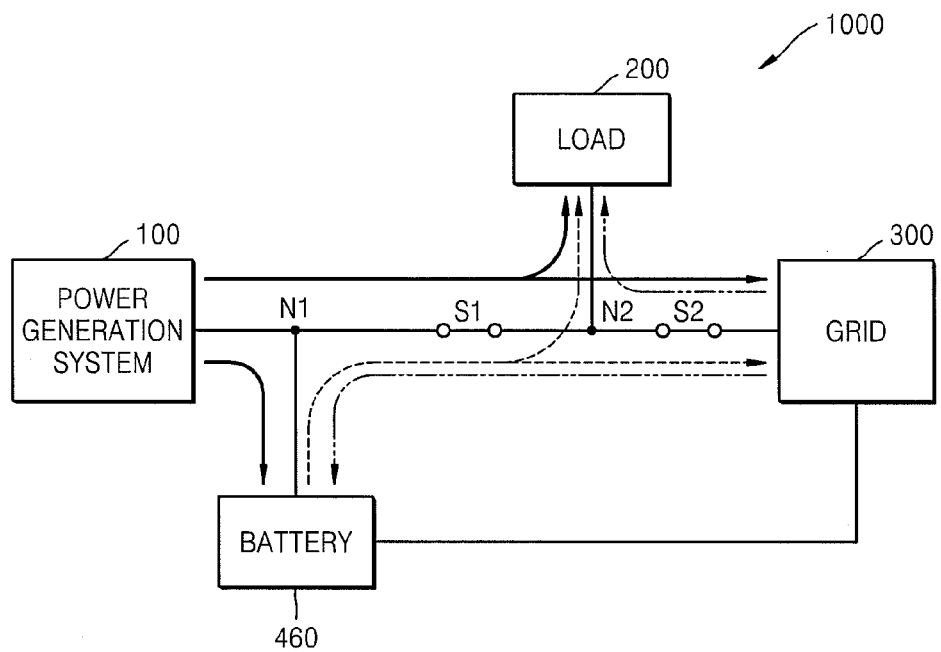
FIG. 3A is a diagram illustrating a power flow of a power storage system when a grid is in a normal state.
Figure 3B:
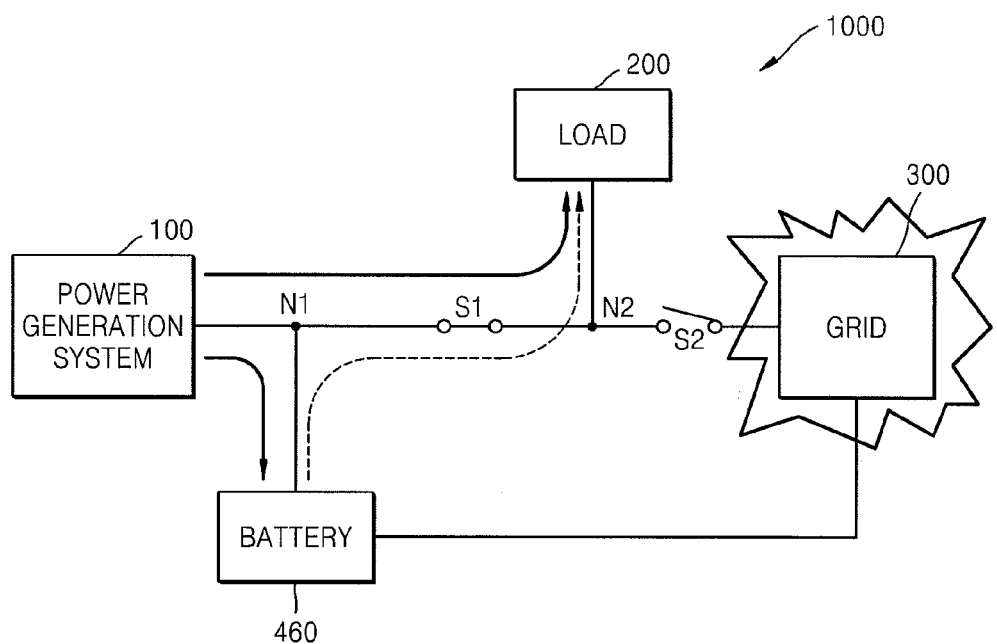
FIG. 3B is a diagram illustrating a power flow of a power storage system when a grid is in an abnormal state.
Figure 3C:
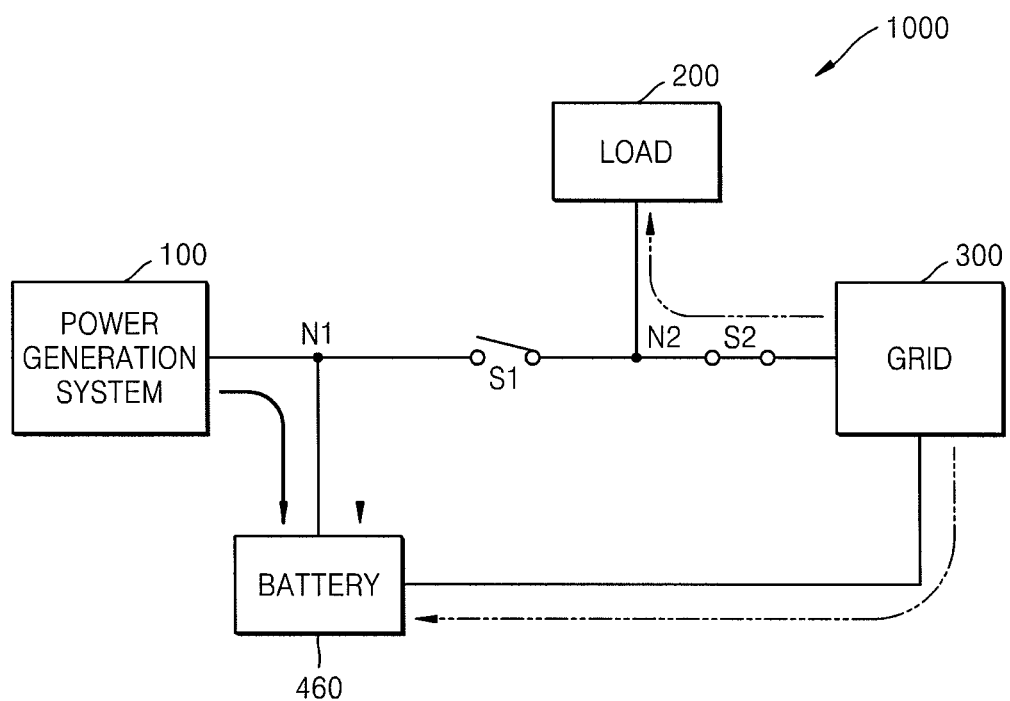
FIG. 3C is a diagram illustrating a power flow of a power storage system when a grid is in a quasi-normal state.

FIGS. 3A through 3C illustrate power flow in the power storage system 1000 of FIG. 1. The power storage system 1000 is schematically illustrated in FIGS. 3A through 3C. Various aspects of the illustrated power flow diagrams also apply to the system 1001 of FIG. 2.

FIG. 3A is a diagram illustrating a power flow of the power storage system 1000 if the grid 300 is in a normal state.

If the grid 300 is in the normal state, the integrated controller 480 turns on the first and second switches S1 and S2. The integrated controller 480 supplies electric power generated by the power generation system 100 to the load 200, and may distribute additional the electric power to the grid 300 by controlling the first power converter 410, the bidirectional inverter 430, the bidirectional converter 440, and the BMS 450. Also, the integrated controller 460 charges the battery 460 to prepare for an abnormal state. The integrated controller 480 may store electric power from the grid 300 in the battery 460, by controlling the bidirectional inverter 430, the bidirectional converter 440, and the BMS 450. Additionally or alternatively, the integrated controller 480 may supply the electric power stored in the battery 460 to the load 200 or distribute the electric power to the grid 300, by controlling the BMS 450, the bidirectional converter 440, and the bidirectional inverter 430. Since the second switch S2 is turned on, the grid 300 may directly supply the electric power to the load 200.

FIG. 3B is a diagram illustrating a power flow of the power storage system 1000 if the grid 300 is in an abnormal state.

The integrated controller 480 monitors the grid 300, and if the grid 300 is in the abnormal state, the integrated controller 480 turns on the first switch S1, and turns off the second switch S2. Accordingly, the load 200 and the grid 300 are disconnected from each other. If the power generation system 100 is able to generate electric power, the integrated controller 480 supplies the electric power generated by the power generation system 100 to the load 200 by controlling the first power converter 410 and the bidirectional inverter 430. If the power generation system 100 is unable to generate electric power, or if electric power generated by the power generation system 100 is insufficient, the integrated controller 480 supplies electric power stored in the battery 460 to the load 200 by controlling the BMS 450, the bidirectional converter 440, and the bidirectional inverter 430. On the other hand, if the amount of electric power generated by the power generation system 100 is sufficient enough to be supplied to the load 200, the integrated controller 480 may store excess electric power generated by the power generation system 100 in the battery 460 by controlling the first power converter 410, the bidirectional converter 440, and the BMS 450. Since the second switch S2 is turned off if the grid 300 is in the abnormal state, the grid 300 is unable to supply the electric power to the load 200.

FIG. 3C is a diagram illustrating a power flow of the power storage system 1000 if the grid 300 is in a quasi-normal state.

The integrated controller 480 monitors the grid 300 so as to determine whether the grid 300 is restored and is in the quasi-normal state. The quasi-normal state has a duration from about 5 minutes to about 10 minutes after the grid 300 is restored from an abnormal state and before returning to a normal state. In the quasi-normal state, the grid 300 is restored but is not immediately connected to the power storage device 400 for safety and/or functionality reasons. If the grid 300 is in the quasi-normal state, the integrated controller 480 turns off the first switch S1 and turns on the second switch S2. Since the second switch S2 is turned on in the quasi-normal state, the restored grid 300 supplies electric power to the load 200. In the quasi-normal state, the integrated controller 480 determines whether electric power stored in the battery 460 is sufficient because electric power of the battery 460 was used in the abnormal state. In addition, sufficient electric power needs to be stored in the battery 460 to prepare for a case if an abnormal state re-occurs. Accordingly, if the electric power stored in the battery 460 is insufficient, the integrated controller 480 controls the second power converter 470 to store electric power from the restored grid 300 in the battery 460. Accordingly, even if the grid 300 is again in an abnormal state, electric power is stably supplied to the load 200 from the battery 460. Also, if the power generation system 100 is able to generate electric power, the integrated controller 480 may store electric power generated by the power generation system 100 in the battery 460 by controlling the first power converter 410, the bidirectional converter 440, and the BMS 450.

Figure 4:
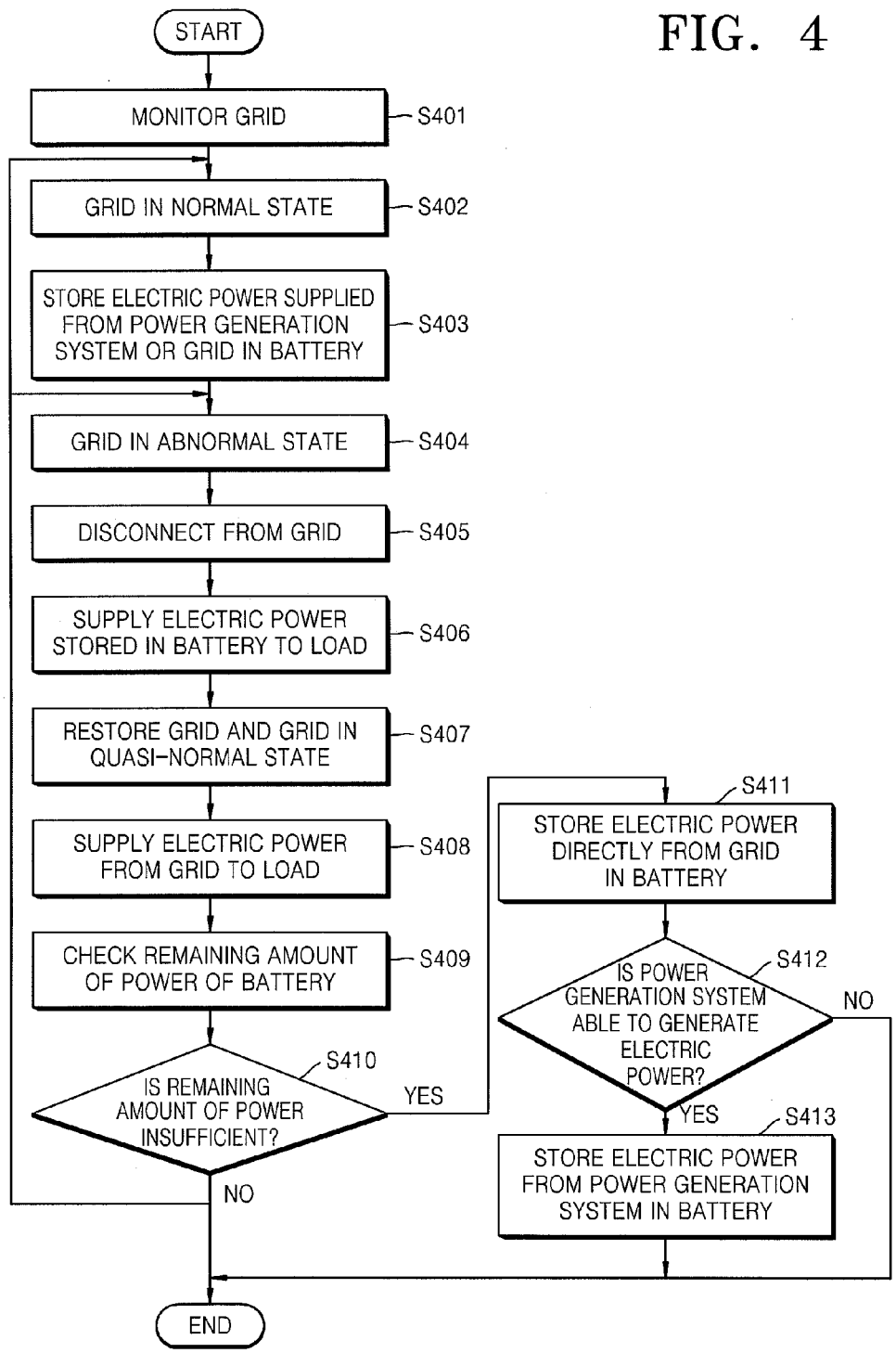
FIG. 4 is a flowchart of a method of controlling the power storage system of FIG. 1.

FIG. 4 is a flowchart of a method of controlling the power storage system 1000 of FIG. 1.

In operation S401, the integrated controller 480 monitors the grid 300. For example, the integrated controller 480 determines whether the grid 300 is in a normal state, an abnormal state, or a quasi-normal state, by determining, for example, a voltage, a current, a temperature, or an AC phase of the grid 300.

If the grid 300 is determined to be in a normal state in operation S402, the integrated controller 480 stores electric power generated by the power generation system 100 or electric power supplied from the grid 300 in the battery 460 in operation S403, by turning on the first and second switches S1 and S2.

If the grid 300 is determined to be in an abnormal state in operation S404, the integrated controller 480 disconnects the grid 300 in operation S405 by turning on the first switch S1 and turning off the second switch S2.

If the grid 300 is in the abnormal state, electric power stored in the battery 460 is supplied to the load 200 in operation S406. In some embodiments, the power storage device 400 operates as an uninterruptible power supply (UPS). If the power generation system 100 is able to generate electric power, electric power generated by the power generation system 100 may be supplied to the load 200. However, if the power generation system 100 is unable to generate electric power or if the electric power generated by the power generation system 100 is insufficient, electric power stored in the battery 460 is supplied to the load 200. In some embodiments, under these circumstances, the battery 460 is the only source of electric power for the load 200.

If the grid 300 is restored and is determined to be in a quasi-normal state in operation S407, the integrated controller 480 turns off the first switch S1 and turns on the second switch S2.

If the second switch S2 is turned on, the grid 300 and the load 200 are connected to each other, and thus during the quasi-normal state, the restored grid 300 supplies electric power to the load 200 in operation S408.

The battery 460 may have consumed most of its stored electric power in a previous abnormal state. Accordingly, in the quasi-normal state, the battery 460 is charged by receiving electric power from the restored grid 300.

In the quasi-normal state, the integrated controller 480 checks an amount of stored power in the batter 460 in operation S409.

If it is determined that the remaining amount of power is insufficient in operation S410, the battery 460 is charged by receiving electric power form the grid in operation S411. Also, if it is determined that the power generation system 100 is able to generate electric power in operation S412, the battery 460 may be charged by receiving electric power from the power generation system 100 in operation S413.

If it is determined that the remaining amount of power is insufficient in operation S410 and the grid 300 is in the normal state as in operation S402, the electric power supplied from the power generation system 100 or the grid 300 may be stored in the battery 460 in operation S413.

If the remaining amount of power of the battery 460 is insufficient, the remaining amount of power of the battery 460 may fall short of a reference level. Alternatively, the battery 460 may be at the charging lower limit or may be unable to stably supply electric power to the load 300 for a certain time. If the remaining amount of power of the battery 460 is sufficient, the remaining amount of power of the battery 460 may exceed the reference level. However, the meaning of the sufficient remaining amount of power is not limited thereto, and the sufficient remaining amount of power may denote a state in which the battery 460 is able to supply electric power to the load 300 for a certain time.

In the quasi-normal state, the remaining amount of power in the battery 460 is checked, and the battery 460 is charged by receiving electric power from the restored grid 300, and thus even when the grid 300 goes back into an abnormal state, electric power may be stably supplied to the load 200 by the battery 460.

As described above, according to the one or more of the above embodiments, power is stably supplied to a load even when abnormal states of the grid repeatedly occur. One or more of the embodiments include a power storage system and a method of controlling the same.

It is understood that the exemplary embodiments described herein are considered in a descriptive sense. Descriptions of features or aspects within each embodiment should typically be considered as available for other similar features or aspects in other embodiments.

What is claimed is:

1. A power storage system, configured to receive power from a power generation system and a grid and to provide power to a load, the power storage system comprising:
   a first power converter connected between the power generation system and a first node, and configured to convert the electric power generated by the power generation system to a direct current (DC) voltage of the first node;
   a bidirectional inverter connected between the first node and a second node, wherein the bidirectional converter is configured to output power of the DC voltage of the first node to the second node after performing DC to alternating current (AC) conversion on the DC voltage of the first node, and to output power of an AC voltage of the second node to the first node after performing AC-DC conversion;
   a bidirectional converter connected between a battery and the first node, wherein the bidirectional inverter is configured to output power of the DC voltage of the first node to the battery after performing DC-DC conversion, and to output power of a DC voltage from the battery to the first node after performing DC-DC conversion, wherein the battery comprises at least one battery cell;
   a battery management system configured to control charging and discharging of the at least one battery cell; and
   an integrated controller configured to charge the battery with electric power from the power generation system and the grid, and to control the first power converter, the bidirectional converter, the bidirectional inverter, and the battery management system so that the electric power is selectively supplied to the load and the grid by discharging the battery,
   wherein the integrated controller is configured to charge the battery with electric power from the grid if the remaining amount of power of the battery is insufficient and the grid is in a quasi-normal state.

2. The power storage system of claim 1, further comprising:
   a first switch connected between the bidirectional inverter and the second node; and
   a second switch connected between the second node and the grid,
   wherein the integrated controller is configured to turn on the first and second switches if the grid is in a normal state, to turn on the first switch and to turn off the second switch if the grid is in an abnormal state, and to turn off the first switch and to turn on the second switch if the grid is in a quasi-normal state.

3. The power storage system of claim 1, wherein the quasi-normal state occurs before the grid is in a normal state after the grid has been in an abnormal state.

4. The power storage system of claim 1, further comprising a second power converter connected between the battery and the grid, wherein the second power converter is configured to output power of the AC voltage from the grid to the battery after performing AC-DC conversion if the grid is in the quasi-normal state.

5. The power storage system of claim 4, wherein the integrated controller is configured to check the remaining amount of power of the battery by controlling the battery management system if the grid is in the quasi-normal state, and if the remaining amount of power is insufficient, to control the battery management system and the second power converter to charge the battery with electric power from the grid.

6. The power storage system of claim 1, wherein the integrated controller is configured to check the remaining amount of power of the battery by controlling the battery management system if the grid is in the quasi-normal state, and if the remaining amount of power is insufficient, to control the first power converter, the bidirectional converter, and the battery management system to charge the battery with electric power from the power generation system.

7. The power storage system of claim 1, wherein the power generation system includes the power generation system and is configured to generate electric power by using solar energy, such as solar heat or sunlight, wind power, geothermal heat, water power, marine power, or hydrogen.

8. The power storage system of claim 7, wherein the power generation system is a solar power generation system and the first power converter adjusts a power generation voltage level according to the maximum power supply voltage for receiving the maximum power from the solar power generation system.

9. The power storage system of claim 1, further comprising a DC voltage stabilizer connected between the first node and the bidirectional inverter, wherein the DC voltage stabilizer is configured to stabilize a voltage of the first node.

10. The power storage system of claim 1, wherein, if the grid is in a normal state, the integrated controller is configured to control the first power converter, the bidirectional inverter, the bidirectional converter, and the battery management system to supply electric power generated by the power generation system to at least one of the load and the grid, to charge the battery, to store electric power from the grid in the battery, and to supply the electric power stored in the battery to at least one of the load and to the grid.

11. The power storage system of claim 1, wherein, if the grid is in an abnormal state, the integrated controller is configured to control the first power converter, the bidirectional inverter, the bidirectional converter, and the battery management system to supply electric power generated by the power generation system to the load, to supply the electric power stored in the battery to the load, and to store the electric power generated by the power generation system in the battery.

12. A method of controlling a power storage system configured to receive power from a power generation system and a grid, and to provide power to a load, a power storage device, and the grid, wherein the power storage system comprises a battery cell, a battery management system for controlling charging and discharging of the battery cell, first and second switches for connecting the load and the grid, and an integrated controller for controlling the battery management system and the first and second switches, the method comprising:
   monitoring the state of the grid;
   if the state of the grid is abnormal, controlling the first and second switches so as to disconnect the load and the power storage system from the grid; and
   if the grid transitions to a quasi-normal state, charging the battery with electric power from the grid.

13. The method of claim 12, further comprising, if the grid is in the abnormal state, supplying electric power from the battery to the load.

14. The method of claim 12, further comprising, if the grid is in the abnormal state, supplying electric power generated by the power generation system to the load.

15. The method of claim 12, further comprising, if the grid is in the quasi-normal state:

controlling the first and second switches to connect the load to the grid; and supplying electric power from the grid to the load.

16. The method of claim 12, further comprising, if the grid is in the quasi-normal state:

conditionally charging the battery with electric power form the grid according to a remaining amount of power in the battery.

17. The method of claim 12, further comprising, if the grid is in the quasi-normal state:

conditionally charging the battery with electric power from the power generation system according to a remaining amount of power in the battery.

18. A power storage system, configured to receive power from a power generation system and a grid and to provide power to a load, the power storage system comprising:

a first switch configured to selectively connect the battery and the power generation system to the load;

a second switch configured to connect the grid to the load; and a controller configured to determine a state of the grid and a state of the battery and to control the first and second switches according to the state of the grid; and wherein the controller is configured to turn the first switch off and to turn the second switch on if the grid is in quasi-normal state.

19. A method of operating a power storage system comprising a battery, the system connected to a power generator, a load, and a power grid, the method comprising:

determining the state of the power grid;

if the power grid is in a normal state, selectively charging the battery with power from at least one of the power generator and the power grid, and selectively providing power to the load from at least one of the power generator, the battery, and the power grid;

if the power grid is in an abnormal state, selectively charging the battery with power from the power generator, and selectively providing power to the load from at least one of the power generator and the battery; and if the power grid is in a quasi-normal state, selectively charging the battery with power from at least one of the power generator and the power grid, and selectively providing power to the load from the grid, wherein an electrical path used to charge the battery if power grid is in the quasi-normal state is different than an electrical path used to the battery if power grid is in the normal or abnormal.

\* \* \* \* \*